UNITED STATES PATENT OFFICE.

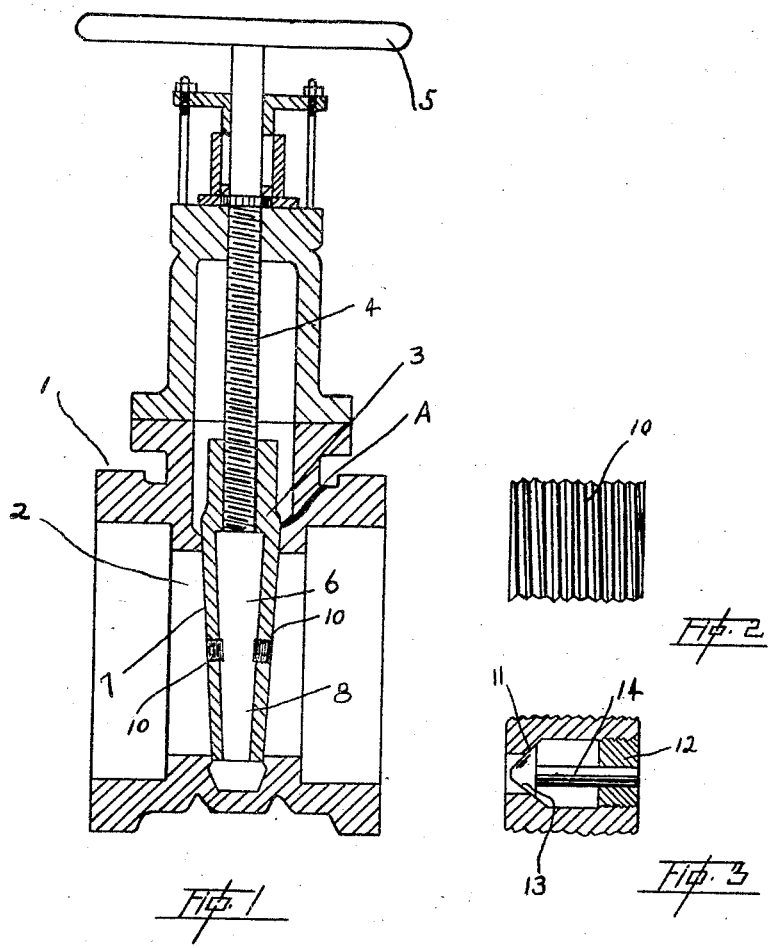

LESLIE M. DAWSON, OF VANCOUVER, BRITISH COLUMBIA, CANADA.

GATE VALVE.

1,411,608. Specification of Letters Patent. Patented Apr. 4, 1922.

Application filed November 11, 1920. Serial No. 423,384.

*To all whom it may concern:*

Be it known that I, LESLIE M. DAWSON, a subject of the King of Great Britain, and a resident of the city of Vancouver, in the Province of British Columbia, Canada, have invented certain new and useful Improvements in Gate Valves, of which the following is a specification.

My invention relates to improvements in gate valves, with more particular reference to those used on pipe lines in which oil or other liquids expansible under heat are conveyed and the object of my invention is to devise a simple and effective means for relieving undue pressure within the valve when closed and thus prevent bursting of the valve and valve chamber which frequenty occurs through such undue pressure.

I attain this object by the construction illustrated in the accompanying drawings in which—

Fig. 1 is a view of a typical gate valve in section with which the invention is embodied.

Fig. 2 is an outside view of the device.

Fig. 3 is a sectional view of the same.

1 indicates generally a gate valve of a kind in common use at the present time, 2 indicating the valve chamber and 3 the valve operated by the stem 4 and handle 5, there being, as is well known, a space 6 between the opposite discs 7 and 8 of the valve.

Now, at the present time, in oil lines, for instance, when such valves are closed, some of the oil in the pipes is trapped in the space 6 as the valve closes and when under exposure to heat such as the sun's heat, while the oil in the pipes on both sides of the gate valve is maintained at say a pressure of 40 lbs. per square inch the pressure within the space 6 rises to many times this pressure, due to the heat of the sun acting on the small amount of oil in the space. In many cases the pressure between the valve discs rises to more than the valve is designed to stand with the result that the chamber cracks at the point indicated by the heavy line in Fig. 1 to which the letter A is attached.

To overcome the risk of such damage I fit into each valve disc a small relief valve fitting, indicated generally in Fig. 1 by the numeral 9, this fitting consisting preferably of an externally threaded nipple 10 the bore of which is provided at one end with a valve seat 11 and at the opposite end with a bridge bar 12, a valve 13 being arranged within the bore co-acting with the valve seat and having a stem 14 extending slidably through the bridge. The bridge 12 does not, of course, fill the bore so that outlet passages therefore exist between the bridge and the sides of the bore. The valves 13 open outwardly.

It may be here stated that the device may be built into the valve discs as an integral part of them and need not necessarily consist of the separate fitting above described which is simply screwed into a hole drilled through the valve disc and threaded correspondingly to the thread of the nipple 10.

It will now be seen that pressure in the pipes will act on the valves to keep them normally closed but that should the pressure within the space 6 rise above that in the pipes the valves will open, thus relieving automatically the pressure in the space and averting all possible danger of cracking the valve or valve chamber casting through excess pressure.

What I claim as my invention is:

1. In a gate valve, the combination with the casing and the spaced valve discs forming the valve, of pressure-relief means mounted in said discs adapted to relieve pressure within the space enclosed by said discs and said casing when the valve is closed.

2. In a gate valve, spaced valve discs forming the valve each provided with an aperture and a valve normally closing said aperture adapted to be opened by pressure between said discs.

3. In a gate valve, spaced valve discs forming the valve each provided with a threaded aperture, an externally threaded sleeve fitting said aperture having at its inner end a valve seat and at its outer end a bridge member, and a valve seated on said valve seat having a stem extending slidably through said bridge.

4. The combination with a gate valve in which spaced valve discs form the valve, of means for automatically relieving pressure between the said discs.

Dated at Vancouver, B. C. this 26th day of October, 1920.

LESLIE M. DAWSON.